United States Patent
Manneville et al.

(10) Patent No.: US 10,066,500 B2
(45) Date of Patent: Sep. 4, 2018

(54) SYSTEM AND METHOD FOR SPINNING UP A ROTARY ELEMENT OF A MECHANICAL DEVICE, PARTICULARLY A TURBOMACHINE

(71) Applicants: Airbus Operations (SAS), Toulouse (FR); Airbus SAS, Blagnac (FR)

(72) Inventors: Alexis Manneville, Toulouse (FR); Norbert Hirtz, Cornebarrieu (FR); Valentin Theard, Toulouse (FR)

(73) Assignees: AIRBUS OPERATIONS SAS, Toulouse (FR); AIRBUS SAS, Blagnac (FR)

( * ) Notice: Subject to any disclaimer, the term of this patent is extended or adjusted under 35 U.S.C. 154(b) by 915 days.

(21) Appl. No.: 14/296,610

(22) Filed: Jun. 5, 2014

(65) Prior Publication Data
US 2014/0373518 A1    Dec. 25, 2014

(30) Foreign Application Priority Data
Jun. 19, 2013 (FR) ...................................... 13 55803

(51) Int. Cl.
  *F01D 19/02*   (2006.01)
  *F02C 7/277*   (2006.01)
  *F16D 33/10*   (2006.01)

(52) U.S. Cl.
  CPC .............. *F01D 19/02* (2013.01); *F02C 7/277* (2013.01); *F16D 33/10* (2013.01); *F05D 2220/34* (2013.01); *F05D 2220/50* (2013.01); *F05D 2270/303* (2013.01); *F05D 2300/50212* (2013.01)

(58) Field of Classification Search
  CPC .......... F16D 33/10; F01D 19/00; F01D 19/02; F01D 19/25; F01D 17/14; F01D 25/08; F02C 3/045; F02C 7/27; F03D 1/065; F02K 3/02
  USPC ........................... 415/177, 200, 176; 60/787
  See application file for complete search history.

(56) References Cited

U.S. PATENT DOCUMENTS

| | | | |
|---|---|---|---|
| 3,774,645 A * | 11/1973 | Pompa ...................... | G01F 1/44 138/44 |
| 4,114,442 A * | 9/1978 | Pratt ...................... | G01K 1/026 374/113 |
| 4,120,159 A | 10/1978 | Matsumoto et al. | |

(Continued)

FOREIGN PATENT DOCUMENTS

| | | |
|---|---|---|
| EP | 2305986 A2 | 6/2011 |
| GB | 996616 | 6/1965 |

(Continued)

OTHER PUBLICATIONS

French Search Report, dated Apr. 16, 2014.

*Primary Examiner* — Dwayne J White
*Assistant Examiner* — Juan G Flores
(74) *Attorney, Agent, or Firm* — Greer, Burns & Crain, Ltd.

(57) ABSTRACT

A system comprising a discharge valve that allows some of the fluid generated by a fluid generating source and intended for a drive torque generating member for a rotary element of a mechanical device to be removed so as to limit the corresponding rotational speed, this being done for a length of time that allows a thermal gradient to be reduced sufficiently that a phenomenon of deformation of said rotary element can be prevented.

9 Claims, 3 Drawing Sheets

(56) References Cited

U.S. PATENT DOCUMENTS

| | | | | |
|---|---|---|---|---|
| 4,161,102 A * | 7/1979 | Jasas | F02C 7/27 | |
| | | | 60/39.826 | |
| 4,339,916 A * | 7/1982 | Burch | F02C 7/277 | |
| | | | 60/39.093 | |
| 4,473,752 A | 9/1984 | Cronin | | |
| 4,506,690 A * | 3/1985 | Mitchell | G05D 16/10 | |
| | | | 137/1 | |
| 4,617,958 A * | 10/1986 | Seidel | G05D 16/163 | |
| | | | 137/488 | |
| 4,631,914 A * | 12/1986 | Hines | F02C 3/305 | |
| | | | 60/262 | |
| 4,687,946 A * | 8/1987 | Jones | F01D 17/20 | |
| | | | 290/40 R | |
| 4,747,270 A * | 5/1988 | Klie | F02N 7/08 | |
| | | | 123/179.31 | |
| 5,127,220 A * | 7/1992 | Jesrai | F02C 7/277 | |
| | | | 60/778 | |
| 6,575,699 B1 | 6/2003 | Jones | | |
| 7,066,710 B2 * | 6/2006 | Wiggins | F16K 31/1635 | |
| | | | 137/488 | |
| 7,487,029 B2 * | 2/2009 | Feeney | F01D 19/00 | |
| | | | 415/17 | |
| 7,507,070 B2 * | 3/2009 | Jones | F01D 5/26 | |
| | | | 415/176 | |
| 7,555,905 B2 * | 7/2009 | Borcea | F02C 6/08 | |
| | | | 215/279 | |
| 2008/0022687 A1 | 1/2008 | Althaus et al. | | |
| 2008/0131264 A1 * | 6/2008 | Lee | F01D 11/24 | |
| | | | 415/116 | |
| 2010/0085676 A1 | 4/2010 | Wilfert | | |
| 2011/0072827 A1 * | 3/2011 | Ciofini | F01D 5/082 | |
| | | | 60/772 | |
| 2011/0308251 A1 * | 12/2011 | Heue | F01D 5/08 | |
| | | | 60/646 | |
| 2013/0174574 A1 * | 7/2013 | Heaton | F02C 7/28 | |
| | | | 60/785 | |
| 2013/0323016 A1 | 12/2013 | Javelot et al. | | |
| 2014/0123673 A1 | 5/2014 | Mouze et al. | | |

FOREIGN PATENT DOCUMENTS

| | | |
|---|---|---|
| GB | 1136584 | 12/1968 |
| WO | 2012107670 | 8/2012 |

* cited by examiner

SYSTEM AND METHOD FOR SPINNING UP A ROTARY ELEMENT OF A MECHANICAL DEVICE, PARTICULARLY A TURBOMACHINE

CROSS-REFERENCES TO RELATED APPLICATIONS

This application claims the benefit of the French patent application No. 1355803 filed on Jun. 19, 2013, the entire disclosures of which are incorporated herein by way of reference.

BACKGROUND OF THE INVENTION

The present invention relates to a system and a method for spinning up a rotary element of a mechanical device.

Although the present invention applies more specifically to the starting of a turbomachine, particularly an aircraft engine, it may be applied to any mechanical device of which a rotary mechanical element (a shaft, rotor, etc.) needs to be spun up in an environment subject to high thermomechanical stresses likely to create deformations in said rotary element.

It is known that during an airplane operating cycle, notably in the case of a short-haul or medium-haul airliner, the airplane touches down at an airport generally to unload the passengers and load other passengers before leaving for another destination. This passenger changeover generally takes between thirty minutes and one hour thirty minutes.

During this time, the airplane engines, which are switched off (for safety reasons), remain hot and do not have time to cool completely. It is estimated as a general rule that an engine is cold after having been switched off for around one hour and thirty minutes.

Thus, during the waiting time, a thermal gradient across the rotor or rotors of the engine causes certain blades and/or rotor or rotors to expand and deform (leading to a reduction in the axial or diametral clearance with respect to the normal axis of rotation of the blading, expansion of the blades, etc.).

Upon restarting, if the engine has not had time to cool sufficiently, the ends of certain rotor blades run the risk of rubbing against the casing or that some blading may be deflected from its axis of rotation a little. This phenomenon is known as a bowed rotor and lasts until the temperature across the blading becomes uniform as a result of operation (rotation and reduction of internal thermal gradients) of the engine.

This phenomenon of rotor deformation leads to an appreciable increase in fuel consumption because of a loss of aerodynamic efficiency notably of various elements of the engine, this being irreversible (because of the wearing away of the blade tips). It is therefore advantageous to be able to prevent or limit this phenomenon of rotor deformation, and this is what the present invention notably seeks to achieve.

SUMMARY OF THE INVENTION

It is an object of the present invention at least to limit a phenomenon of deformation of a rotary element (a shaft, rotor, etc.) of a mechanical device caused by thermomechanical stresses as said rotary element is spun up (or started).

The invention relates to a system for spinning up a rotary element of a mechanical device, said system comprising:
a fluid generating source able to generate a fluid flow;
a drive torque generating member connected to the fluid generating source via a pipe referred to as the main pipe capable of transmitting the fluid generated by the fluid generating source, said drive torque generating member being able, when subjected to a flow of fluid, to generate a mechanical force capable of spinning up said rotary element of said mechanical device; and
a starting valve able to be controlled in such a way as to be able to be brought into one or the other of the following positions: an open position and a closed position, said starting valve being arranged on the main pipe between the fluid generating source and the drive torque generating member in such a way as to form a first section of pipe between said fluid generating source and said starting valve and a second section of pipe between said starting valve and said drive torque generating member.

According to the invention, said system additionally comprises a discharge valve able to be controlled in such a way as to be able to be brought into one or the other of the following positions: an open position and at least one closed position, said discharge valve being arranged on an auxiliary pipe connected to said second section of the main pipe in such a way as to create a fork for the transmission of fluid.

Thus, according to the invention, said spin-up system comprises a discharge valve which, because it is positioned at a fork in the pipe, allows (when it is open) some of the fluid generated by the fluid generating source to be removed and thus makes it possible for not all of this fluid to be transmitted to the drive torque generating member, thus limiting the corresponding rotational speed.

This limiting of the rotational speed, at least at the start of spin-up (or starting) as long as a significant temperature gradient remains across the rotary element as specified hereinbelow, makes it possible to prevent (or at least limit) a phenomenon of deformation of the rotary element of the mechanical device. Of course, by bringing the discharge valve into its closed position, the system can operate in the usual way, transmitting all of the fluid to said drive torque generating member.

Applied to a system for starting an aircraft turbomachine, the present invention makes it possible to avoid a rotor deformation phenomenon like the aforementioned bowed rotor phenomenon.

In a preferred embodiment, the cross section of said first section of pipe is greater than the cross section of said second section of pipe. Advantageously, the cross section of said first section has a diameter lying within a range of values defined between 101% and 115% of the diameter of the cross section of said second section.

Said system may have at least some of the following features, considered individually or in combination:
a control unit which simultaneously controls said fluid generating source, said starting valve and said discharge valve;
a first monitoring unit configured to monitor at least a first parameter allowing information to be provided about a deformation of thermomechanical origin of said rotary element of the mechanical device (for example a turbomachine rotor) while it is being spun up. Preferably, said first monitoring unit comprises at least a sensor of mechanical vibrations indicative of a deformation; and
a second monitoring unit configured to monitor a second parameter making it possible to provide information relating to a deformation of thermomechanical origin of said rotary element of the mechanical device before it is spun up.

The present invention also relates to a mechanical device provided with a rotary element, particularly a turbomachine provided with a rotor, which is notable in that it comprises a spin-up system like the one described hereinabove.

In a preferred embodiment, said fluid generating source is an air generating source and said drive torque generating member is a turbine.

The present invention also relates to a method for spinning up a rotary element (a shaft, rotor, etc.) of a mechanical device, using a spin-up system like the aforementioned.

According to the invention, this method comprises the following successive steps:
- a first step, during which the starting valve and the discharge valve of the spin-up system are both open so that only some of the fluid generated by the fluid generating source is transmitted to said drive torque generating member, the rest of the fluid being removed via said discharge valve; and
- a second step succeeding said first step, during which said discharge valve is closed and said starting valve remains open so that all of the fluid generated by the fluid generating source is transmitted to said drive torque generating member via said starting valve.

In a first embodiment, said first step is performed for a predetermined length of time (that allows a sufficient reduction in the internal thermal gradient to be obtained), at the end of which said second step is performed.

Furthermore, in a second embodiment, monitoring is carried out in order to check whether at least one first specific condition indicative of the absence of deformation is satisfied, and said second step is performed as soon as said first particular condition is satisfied. In this second embodiment, for preference, said monitoring consists in monitoring at least a first parameter allowing information to be provided relating to the existence of deformation of thermomechanical origin of said rotary element of the mechanical device (for example the rotor of a turbomachine) while it is being spun up.

Moreover, in another embodiment, said method additionally comprises a checking step, prior to said first step, and consisting in checking whether at least one second particular condition indicative of the absence of deformation is satisfied, and if said second particular condition is satisfied, the performing of the first step is inhibited and said second is performed directly. For preference, said checking consists in measuring at least one second parameter making it possible to provide information relating to the existence of a deformation of thermomechanical origin of said rotary element of the mechanical device prior to spin-up.

Moreover, in one particular embodiment, the rate of flow of fluid removed via the discharge valve during said first step is determined by a control unit of the spin-up system on the basis of data gathered from the mechanical device.

Thus, at the beginning of spin up (or starting) during said first step, only some of the fluid generated by the fluid generating source is transmitted to said drive torque generating member via said starting valve so that the rotational speed is limited, and is so for as long as a significant thermal gradient capable of causing deformation remains.

The rotational speed is thus limited for the duration of said first step during which the temperature becomes uniform across the mechanical device, and deformations disappear.

The second step during which all of the fluid generated by the fluid generating source is transmitted to said drive torque generating member so that maximum speed is attained is therefore performed only when the temperature gradient causing the deformation has been reduced enough for the deformation to have disappeared.

BRIEF DESCRIPTION OF THE DRAWINGS

The figures of the attached drawing will make it easy to understand how the invention may be embodied. In these figures, identical references denote elements that are similar.

DETAILED DESCRIPTION OF THE PREFERRED EMBODIMENTS

Figure 1:
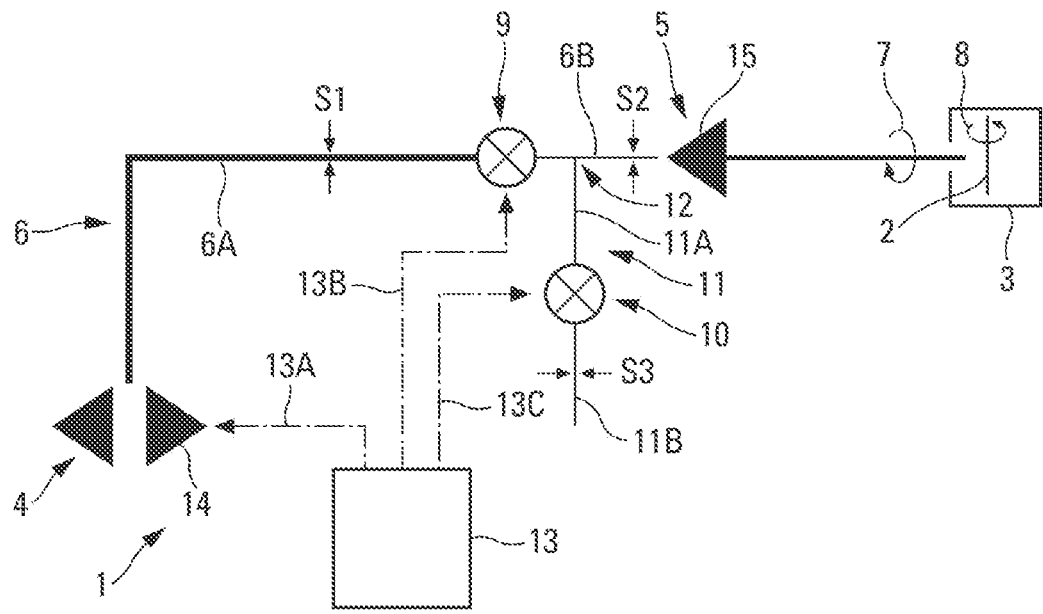
FIG. 1 is a block diagram of a system for spinning up a rotary element of a mechanical device, which illustrates one embodiment of the invention.

The system 1 illustrating the invention and depicted schematically in FIG. 1 is intended to spin up a rotary element 2 (a shaft, rotor, etc.) of a mechanical device 3.

Said system 1 may be applied to any mechanical device 3 a rotary mechanical element 2 of which is to be spun up in an environment subjected to high thermomechanical stresses capable of creating deformations in said rotary element 2, and notably to an aircraft turbomachine.

Said system 1 is of the type comprising:
- a conventional fluid generating source 4, for example a pneumatic source or hydraulic source, capable of generating a flow of fluid (air, etc.);
- a drive torque generating member 5 connected to the fluid generating source 4 by a pipe 6 referred to as the main pipe capable of transmitting the fluid generated by the fluid generating source 4. Said member 5 is able to produce, when subjected to a flow of fluid, a mechanical force (illustrated by an arrow 7 in FIG. 1) allowing said rotary element 2 of the mechanical device 3 to be spun up as illustrated by an arrow 8; and
- a starting valve 9 able to be controlled in such a way as to be able to be brought into one or the other of the following positions: a closed position (indicated by a cross in FIGS. 1 and 2A) and an open position (without a cross).

The starting valve 9 is arranged on the main pipe 6 between the source 4 and the member 5 so as to create a section of pipe 6A between the source 4 and said starting valve 9 and a section of pipe 6B between said starting valve 9 and said member 5.

According to the invention, said system 1 additionally comprises a discharge valve 10 able to be controlled in such a way as to be able to be brought into one or the other of the following positions: a closed position (indicated by a cross in FIGS. 1, 2A and 2C) and at least one open position (without a cross). In addition, this discharge valve 10 is arranged on an auxiliary pipe 11 of which a first section 11A is connected to the section of pipe 6B in such a way as to create a fork 12 for the transmission of fluid.

Said system 1 additionally comprises a control unit 13 which simultaneously controls said fluid generating source 4, said starting valve 9 and said discharge valve 10, as illustrated schematically by the chain line arrows 13A, 13B and 13C respectively.

Thus, said system 1 comprises a discharge valve 10 which, through being arranged at a fork 12 in the pipe, when open allows some of the fluid generated by the source 4 to be removed via a section 11B of the pipe 11 (preferably into the external environment) so that not all of the fluid is transmitted to the drive torque generating member 5 thus limiting the corresponding rotational speed. Of course, by bringing the discharge valve 10 into its closed position, the system 1 can operate in the usual way, transmitting all of the fluid to said member 5.

Figure 2A:
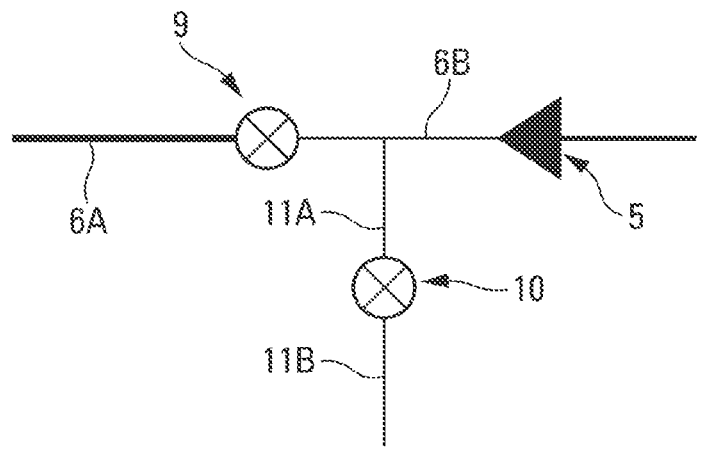
FIGS. 2A to 2C show various steps in the successive controls of the system of FIG. 1.

Said system 1 allows a new method of spinning up the rotary element 2 to be performed. When the system 1 is switched off, before being switched on, the two valves 9 and 10 are closed, as depicted in FIG. 2A.

Figure 2B:
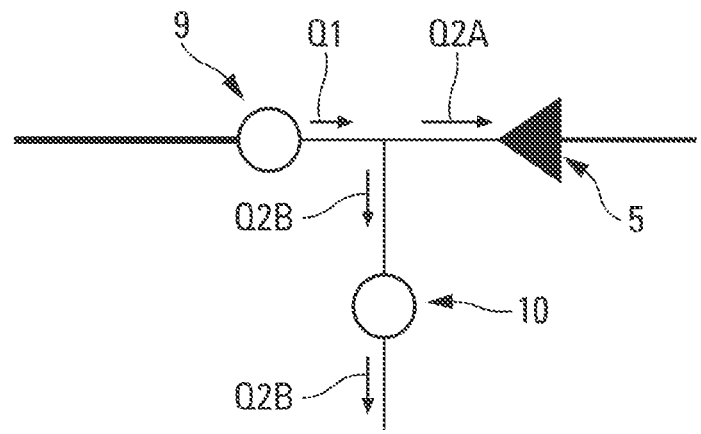
Figure 2C:
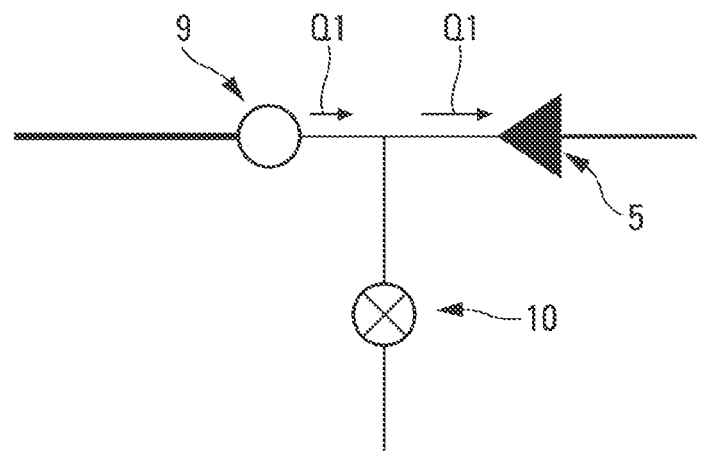

According to the invention, this method comprises the following successive steps:
- a first step (illustrating a prevention mode), in which the starting valve 9 and the discharge valve 10 of the system 1 are both open, as depicted in FIG. 2B, so that only some of the fluid generated by the source 4 and passing through the starting valve 9 (illustrated by an arrow Q1) is transmitted to the member 5. This proportion of fluid is illustrated by an arrow Q2A. The rest of the fluid (illustrated by an arrow Q2B) is removed via the discharge valve 10; and
- a second step (illustrating a main mode) that succeeds said first step (or prevention mode), in which said discharge valve 10 is closed and said starting valve 9 remains open, as depicted in FIG. 2C, so that all of the fluid generated by the source 4 is transmitted to said drive torque generating member 5, as illustrated by arrows Q1.

Thus, at the start of spin up (or startup), during said first step, and for as long as a significant thermal gradient able to generate deformation as specified hereinbelow remains, only some of the fluid generated by the source 4 is transmitted to said member 5 so that the rotational speed is limited.

Figure 3:
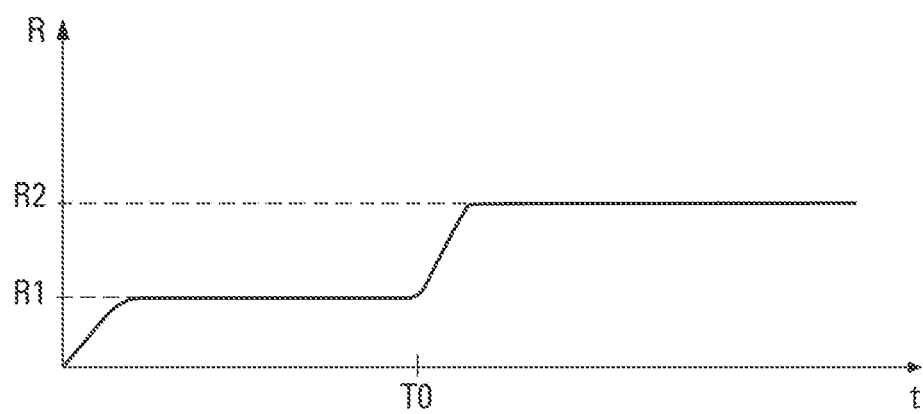
FIG. 3 is a graph illustrating a rotational speed exhibiting a level, during the implementing of the invention.

The rotational speed R is thus limited to a level R1 as illustrated schematically in FIG. 3 for the length of time T0 of said first step, during which the temperature becomes relatively uniform across the mechanical device 3.

Said second step, during which all of the fluid is transmitted to said member 5 so that the maximum speed R2 is reached, is performed when the temperature gradient causing the deformation has reduced enough for the deformation to have disappeared.

During the switchover from prevention mode to the main mode, there is a reduction in the rate of leakage (or discharge) allowing a partial or total progressive increase in the drive torque to the member 5 through the partial or total progressive closure of the discharge valve 10.

Figure 4:
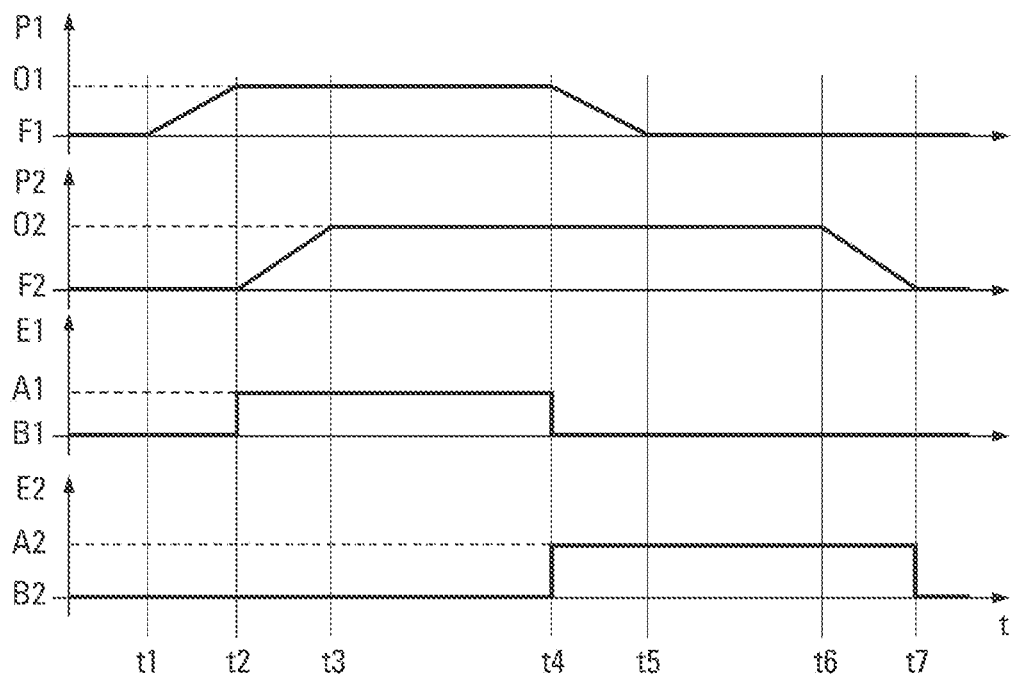
FIG. 4 shows timing diagrams illustrating various actions performed during spin up.

Timing diagrams relating to the abovementioned procedure are depicted in FIG. 4. This FIG. 4 comprises four superposed graphs, defined along the same time abscissa t (comprising successive instants t1 to t7) and successively illustrating, from the top downwards:
- the position P1 of the discharge valve 10 between a closed position (F1) and an open position (O1);
- the position P2 of the starting valve 9 between a closed position (F2) and an open position (O2);
- the situation E1 of the first method step: performance (A1) or absence of performance (B1) of this step; and
- the situation E2 of the second method step: performance (A2) or absence of performance (B2) of this step.

More specifically:
- initially, the system 1 is not in operation and the valves 9 and 10 are closed;
- at an instant t1, the discharge valve 10 is commanded (by the control unit 13) to open, and is wide open at an instant t2;
- at this instant t2, the starting valve 9 is commanded (by the control unit 13) also to open, this instant t2 corresponding to the start of the first step, and it is wide open at an instant t3;
- at a later instant t4, the discharge valve 10 is commanded (by the control unit 13) to close, this instant t4 corresponding to the end of the first step or to the start of the second step, and it is fully closed at an instant t5; and
- at an instant t6, the starting valve 9 is commanded (by the control unit 13) to close and is completely closed at an instant t7, this instant t7 corresponding to the end of the second step and therefore to the end of the spin-up procedure.

The opening and closing of the valves 9 and 10 are therefore carried out in a coordinated fashion so as to allow transfers of power according to the functions to be performed: prevention mode or main mode. The discharge valve 10 is operated with a phase lead with respect to the starting valve 9.

The discharge valve 10 therefore, through suitable control, is able to create a level R1 by setting a maximum flow entering the member 5. The discharge valve 10 is connected to the main pipe 6 by the pipe 11 which has a cross section S3 (leakage cross section) that is variable or fixed. This discharge valve 10 can be produced in various ways and allows the leakage pipe 11 to be opened partially or fully (i.e., progressively or not). To do this, the control unit 13 controls the angle of opening of the discharge valve 10.

Moreover, in a preferred embodiment, the cross section S1 of the section of pipe 6A (FIG. 1) is greater than the cross section S2 of the section of pipe 6B.

This feature, which dictates the main supply flow rate, allows the maximum flow rate to be limited (sonic throat or any other throttling device) in the event of breakage (discharge valve) or any other failure of the invention. This cross section, which may be variable or fixed according to the operational conditions, performs functions of protection and of limiting the pneumatic or other power tapped from the source 4 of the system 1.

The increase in cross section is established according to objectives of limiting power upstream and downstream and is variable or fixed according to operational conditions. In one particular embodiment, the cross section S1 of the section 6A has a diameter falling within a range of values defined between 101% and 115% of the diameter of the cross section S2 of the section 6B.

In a preferred embodiment, said fluid generating source 4 comprising an air generating source 14 and said drive torque generating member 5 comprises a turbine 15.

Furthermore, in a specific application to the starting of a turbomachine, said device 3 corresponds to an aircraft turbomachine and the rotary element 2 corresponds to the rotor of this turbomachine. The flow of air generated by the source 14, for example an auxiliary power unit or APU, is sent to the turbine 15 via the valve 9 which for example corresponds to a starter valve of the ATS (Air Turbine Starter) type. At output the turbine 15 produces a mechanical force capable of turning the rotor of the engine (turbomachine) in order to start it. The engine is then ignited in the usual way after fuel has been injected into the appropriate parts of the engine which have been set in rotation by the rotor.

In a simplified embodiment, during the spinning up of the rotary element 2, the control unit 13 switches the system 1 to prevention mode and then, after a predetermined length of time T0, switches it into main mode. By way of illustration, in order to prevent a phenomenon of the "bowed rotor" type, a length of time T0 of the order of 25 to 50 seconds is compatible with the reduction of the corresponding internal thermal gradient (in the rotor bladings and in the internal cavities of the engine).

Furthermore, in a more evolved embodiment, the prevention mode is performed only if the control unit 13 obtains information indicating that there is a temperature gradient across the rotary element 2, for example in the blading of a turbomachine rotor, or that there is deformation of the rotary element 2 (expansion of the material of the rotary element 2, clearance with respect to the axis of rotation), otherwise operation in prevention mode is prohibited. Such information is obtained when the rotary element 2 is not being driven in rotation, with both valves 9 and 10 closed.

Figure 5:
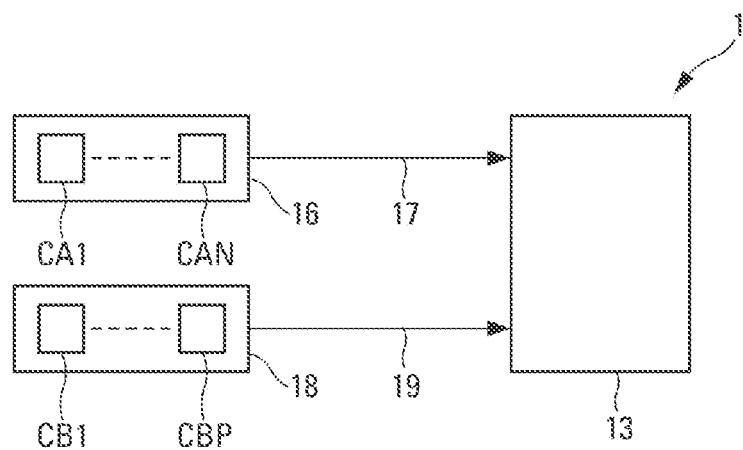
FIG. 5 shows one particular embodiment of monitoring means that form part of a spin-up system.

To do that, the system 1 comprises a monitoring unit 16 which is connected by a link 17 to the control unit 13 as depicted in FIG. 5, and which is configured to monitor at least one parameter able to provide information indicative of a deformation of thermomechanical origin of the rotary element 2 of the mechanical device 3 before it is spun up. Said monitoring unit 16 for that purpose comprises at least one sensor, and preferably a plurality of sensors CA1 to CAN, N being an integer greater than 1.

By way of illustration, said monitoring unit 16 may, by way of sensors CA1 to CAN, comprise at least some of the following sensors:
one or more temperature sensors sensing the temperature of the device 3 and/or of the outside of the device 2;
a clock for determining the time for which the device 3 is switched off. Beyond a certain length of time (for example beyond 1 h30 in the case of a phenomenon of the aforementioned "bowed rotor" type) the rotary element 2 is considered to be cold and the risk of deformation is considered not to exist;
a clock for determining the operating time of the device 3 according to the power or energy supplied in its previous operation, for example in a previous flight in the case of an aircraft turbomachine; and
one or more displacement transducers to measure radial or axial clearances of the shaft line or lines with respect to the static or rotary structures that are to be protected.

Because the angle of opening of the discharge valve 10 can be controlled, transition from prevention mode to main mode takes place progressively, under the control of the control unit 13.

Moreover, in one particular embodiment, the duration or end of the prevention mode may be determined via the control unit 13 on the basis of data gathered from the device 3. These data are compared against a threshold by the control unit 13 and the crossing of this threshold (in one direction or the other depending on the data item being considered) causes the switching over of the system 1 by the control unit 13 into main mode (and therefore the end of the prevention mode). This information is obtained when the rotary element 2 is driven in rotation, with both valves 9 and 10 open.

To do this, the system 1 comprises a monitoring unit 18 which is connected via a link 19 to the control unit 13 as depicted in FIG. 5 and which is configured to monitor at least one parameter allowing information to be supplied relating to a deformation of thermomechanical origin of said rotary element 2 of the mechanical device 3 during spin up (prevention step).

Said monitoring unit 18 comprises at least one sensor and preferably a plurality of sensors CB1 to CBP, P being an integer greater than 1.

In one particular embodiment, said monitoring unit 18 comprises at least one sensor of mechanical vibrations indicative of a deformation.

Furthermore, by way of illustration, said monitoring unit 18 may also comprise, by way of sensors CB1 to CBP, at least some of the following sensors:
one or more sensors sensing temperature inside the device 3, whatever the location (compressors, bearings, cavities, gas outlet, etc.);
one or more sensors sensing temperature of fluids of the device 3 (oil, fuel in particular);
one or more sensors sensing internal or external temperatures of static parts of the device 3;
one or more sensors of rotational speed of shafts and/or rotary parts of the device 3;
one or more displacement transducers to measure radial or axial clearances of the shaft line or lines with respect to the static or rotary structures that are to be protected;
one or more load sensors for measuring the movements of bearings or structures;
one or more (static and/or total) pressure sensors and temperature sensors measuring pressure or temperature in the supply (measuring entropy, supply flow rate, etc.);
one or more (static and/or total) pressure and temperature sensors in the discharge (measuring entropy, supply flow rate, etc.); and
one or more (static and/or total) pressure and temperature sensors measuring at the supply to the member 5 (measuring entropy, supply flow rate, etc.).

Furthermore, in one particular embodiment, the rate of flow of fluid (air) discharged during the prevention mode is determined by the control unit 13 on the basis of data gathered from the device 3. Thus, before the control unit 13 switches the system 1 over to main mode (and therefore before the end of the prevention mode), the discharge valve 10 (the angle of opening of which can be controlled) is controlled on the basis of the data received by the sensors, with a view to modulating the rotational speed of the rotary element 2 in order not to damage said rotary element 2 and/or said mechanical device 3. In this particular embodiment, the prevention mode therefore involves active regulation of the rotational speed of the rotary element 2, which regulation is obtained by modulating the openness of the discharge valve 10, i.e., by actively regulating the flow rate.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for spinning up a rotary element of a mechanical device, said system comprising:
a fluid generating source arranged to generate a fluid flow;
a drive torque generating member connected to the fluid generating source via a pipe referred to as the main pipe capable of transmitting the fluid generated by the fluid generating source, said drive torque generating member being arranged, when subjected to the fluid flow, to generate a mechanical force capable of spinning up said rotary element of said mechanical device;

a starting valve arranged to be controlled in such a way as to be brought into one or the other of the following positions: an open position and a closed position, said starting valve being arranged on the main pipe between the fluid generating source and the drive torque generating member in such a way as to form a first section of pipe between said fluid generating source and said starting valve and a second section of pipe between said starting valve and said drive torque generating member, wherein the cross section of said first section of pipe is greater than the cross section of said second section of pipe;

a discharge valve arranged to be controlled in such a way as to be brought into one or the other of the following positions: at least an open position and a closed position, said discharge valve being arranged on an auxiliary pipe connected to said second section of the main pipe in such a way as to create a fork for the transmission of fluid;

a first monitoring unit configured to monitor at least a first parameter allowing information to be provided about a deformation of thermomechanical origin of said rotary element of the mechanical device while it is being spun up; and a control unit connected to said first monitoring unit, said fluid generating source, said starting valve and said discharge valve wherein said control unit simultaneously controls said discharge valve upon a data received by said control unit from said first said fluid generating source, said starting valve and monitoring unit.

2. The system as claimed in claim 1, wherein the first monitoring unit comprises at least a sensor of mechanical vibrations indicative of a deformation.

3. The system as claimed in claim 1, further comprising a second monitoring unit electronically connected to said control unit and configured to monitor at least one second parameter making it possible to provide information relating to a deformation of thermomechanical origin of said rotary element of the mechanical device before it is spun up.

4. The system as claimed in claim 1, wherein said fluid generating source is an air generating source and said drive torque generating member is a turbine.

5. A method for spinning up a rotary element of a mechanical device using a spin-up system, said system comprising:

a fluid generating source arranged to generate a fluid flow;

a drive torque generating member connected to the fluid generating source via a pipe referred to as the main pipe capable of transmitting the fluid generated by the fluid generating source, said drive torque generating member being arranged, when subjected to a flow of fluid, to generate a mechanical force capable of spinning up said rotary element of said mechanical device; and a starting valve arranged to be controlled in such a way as to be brought into one or the other of the following positions: an open position and a closed position, said starting valve being arranged on the main pipe between the fluid generating source and the drive torque generating member in such a way as to form a first section of pipe between said fluid generating source and said starting valve and a second section of pipe between said starting valve and said drive torque generating member, a discharge valve arranged to be controlled in such a way as to be brought into one or the other of the following positions: at least an open position and a closed position, said discharge valve being arranged on an auxiliary pipe connected to said second section of the main pipe in such a way as to create a fork for the transmission of fluid; and a first monitoring unit configured to monitor at least a first parameter allowing information to be provided about a deformation of thermomechanical origin of said rotary element of the mechanical device while it is being spun up, the method comprising the following successive steps:

a first step, during which a starting valve and a discharge valve of the spin-up system are both open so that only some of a fluid generated by a fluid generating source is transmitted to a drive torque generating member, the rest of the fluid being removed via said discharge valve; and a second step succeeding said first step, during which said discharge valve is closed and said starting valve remains open so that all the fluid generated by the fluid generating source is transmitted to said drive torque generating member via said starting valve, wherein, during said first step, monitoring is carried out in order to check whether at least one first specific condition indicative of the absence of deformation is satisfied, and said second step is performed as soon as said first particular condition is satisfied.

6. The method as claimed in claim 5, wherein said monitoring comprises monitoring at least a first parameter allowing information to be provided relating to the existence of deformation of thermomechanical origin of a rotary element of the mechanical device while it is being spun up.

7. The method as claimed in claim 5, further comprising a checking step, prior to said first step, including checking whether at least one second particular condition indicative of the absence of deformation is satisfied, and if said second particular condition is satisfied, the performing of the first step is inhibited and said second is performed directly.

8. The method as claimed in claim 7, wherein said checking comprises measuring at least one second parameter making it possible to provide information relating to the existence of a deformation of thermomechanical origin of a rotary element of the mechanical device prior to spin-up.

9. The method as claimed in claim 5, wherein the rate of flow of fluid removed via the discharge valve during said first step is determined by a control unit of the spin-up system on the basis of data gathered from the mechanical device.

* * * * *